(12) United States Patent
Aho

(10) Patent No.: US 8,052,803 B2
(45) Date of Patent: Nov. 8, 2011

(54) METHOD FOR PREVENTING CHLORINE DEPOSITION ON THE HEAT-TRANSFERRING SURFACES OF A BOILER

(75) Inventor: Martti Aho, Palokka (FI)

(73) Assignees: Kemira Oyj, Helsinki (FI); Metso Power Oy, Tampere (FI)

( * ) Notice: Subject to any disclaimer, the term of this patent is extended or adjusted under 35 U.S.C. 154(b) by 416 days.

(21) Appl. No.: 11/920,709

(22) PCT Filed: Jun. 12, 2006

(86) PCT No.: PCT/FI2006/050252
§ 371 (c)(1),
(2), (4) Date: Nov. 16, 2007

(87) PCT Pub. No.: WO2006/134227
PCT Pub. Date: Dec. 21, 2006

(65) Prior Publication Data
US 2009/0038310 A1 Feb. 12, 2009

(30) Foreign Application Priority Data
Jun. 16, 2005 (FI) .................................. 20055317
Jan. 23, 2006 (FI) .................................. 20065045

(51) Int. Cl.
*B08B 3/04* (2006.01)

(52) U.S. Cl. .................. 134/34; 134/37; 165/134.1

(58) Field of Classification Search .............. None
See application file for complete search history.

(56) References Cited

U.S. PATENT DOCUMENTS

| 3,864,458 | A | 2/1975 | Roberts |
| 4,842,834 | A | 6/1989 | Burton |
| 2003/0014909 | A1 | 1/2003 | Schofield |
| 2004/0068988 | A1 | 4/2004 | Anderson |
| 2006/0290935 | A1 * | 12/2006 | Martin et al. ........... 356/438 |

FOREIGN PATENT DOCUMENTS

| JP | 11-166187 | 6/1999 |
| WO | 9803616 | 1/1998 |

OTHER PUBLICATIONS

Tao Nekken K.K., Japan: "Additives for incineration of municipal refuses to reduce noxious emissions", Jpn. Kokai Tokkyo Koho, 7 pp, abstract & JP, A, 11166187, 19990622.

* cited by examiner

Primary Examiner — Michael Barr
Assistant Examiner — Ryan Coleman
(74) Attorney, Agent, or Firm — Fildes & Outland, P.C.

(57) ABSTRACT

The invention relates to a method for preventing chlorine deposition on the heat-transferring surfaces of a boiler, particularly on the superheater, in which boiler a fuel with a chlorine content, such as a biomass or waste fuel, is burned. And to which steam boiler is fed, preferably in the superheater area, a compound with a sulphate content, which forms a particular reagent to fix alkali compounds. The said compound is ferric(III)sulphate, $Fe_2(SO_4)_3$ and/or aluminium(III) sulphate, $Al_2(SO_4)_3$.

4 Claims, 2 Drawing Sheets

METHOD FOR PREVENTING CHLORINE DEPOSITION ON THE HEAT-TRANSFERRING SURFACES OF A BOILER

The present invention relates to a method for preventing chlorine deposition on the heat-transferring surfaces of a boiler, particularly on the superheater, in which boiler a fuel with a chlorine content, such as a biomass or waste fuel, is burned, and in which case a compound with a sulphate content, which forms a particular reagent to fix alkali compounds, is fed to the furnace, preferably in the superheater area.

There has been a known attempt to prevent the deposition of chlorine, by mixing different fuels. Experiments have also been made with adding reagents to the fuel flow. During this research it has appeared that, among others, both sulphur and aluminium silicate compounds have the effect of preventing the deposition of chlorine. The best known are the following four sulphur reagents: $(NH_4)_2SO_4$, $NH_4HSO_4$, $FeSO_4$, and $H_2SO_4$.

Both sulphur and aluminium silicate compounds can react with alkali chloride, in which case the chlorine forms hydrochloric acid, (the chlorine in which is not transferred to the deposition), while the alkali remains attached to either the sulphate (sulphur) or aluminium silicate $(AlO_3 \cdot nSiO_2 \cdot yH_2O$, the amount of silicon dioxide and crystal water may vary). This means that there must be sufficient silica present in the oxide form for the aluminium to act. Here, the oxide form refers to all silicon compounds containing oxygen.

Patent publications FI 93674 and DD294548 disclose some circulating-mass and fluid-bed boilers. Both of these publications disclose the addition of substances with a kaolin content (=aluminium silicate, kaolinite $Al_2Si_2O_5(OH)_4$) to the furnace. One intention is to prevent fouling and deposition on the hot surfaces.

Publication US 2004/0068988 A1 discloses a method, in which corrosion caused in heat exchangers by chlorine is reduced by adding an additive solution containing sulphur to the channel in which the heat exchangers are located.

Publication FI 823943 discloses a method for improving the combustion of fuels intended to produce energy. By means of the method, corrosion and fouling of the furnace surfaces are reduced. In the method, a catalyser, which contains at least the elements Al, Mg, Mn, and Zn, is fed to the combustion zone.

The use of aluminium compounds in the high-temperature zone of an incinerator, in order to prevent depositions, is also known (Patent Abstracts of Japan, summary of publication JP 62261802).

Publication U.S. Pat. No. 6,649,135 discloses the use of aluminium silicates in a so-called dechlorination chamber 16, in a reaction fixing an alkali and releasing HCl.

International patent application WO 02/059526 discloses in detail a method for capturing an alkali from alkali chlorides in combustion processes. In the method, a compound, which is one of the following ammonium sulphate $(NH_4)_2SO_4$, ammonium bisulphate $(NH_4)HSO_4$, ferrous sulphate $FeSO_4$, or sulphuric acid $H_2SO_4$, is fed to the furnace. The intention is to create sulphur trioxide $(SO_3)$, which is formed indirectly through sulphur dioxide $(SO_2)$ from compounds. According to the publication, the compound is fed preferably in the flue-gas temperature range 600-1000° C.

Publication DE 19249022 also presents sulphur dioxide $(SO_2)$ as a reagent for fixing alkali chlorides. The publication also refers to sulphur trioxide $(SO_3)$, but the precise connection between them is not explained. Magnesium sulphate $(MgSO_4)$ is presented as an economical compound that is a source of sulphur dioxide $(SO_2)$.

The invention is intended to create a new method, more advantageous than previous methods, for preventing chlorine deposition particularly in superheaters.

The characteristic features of the present invention are stated in the accompanying claims. It has been surprisingly observed that the compounds presented, ferric(III)sulphate, $Fe_2(SO_4)_3$ and aluminium(III)sulphate, $Al_2(SO_4)_3$, are more effective for the purpose of fixing alkali compounds than any compound suggested previously. The additives in question have a strong tendency to disintegrate in the furnace, in such a way that their sulphur is almost entirely converted to sulphur trioxide $(SO_3)$. They should be added close to the superheater surfaces or similar in a liquid form in an efficient manner in drops, in order to produce a powerful effect.

The invention is particularly suitable for application in fluid-bed boilers, or in other steam boilers with a similar flue-gas temperature range (600-1000° C.). Though the invention is of greatest importance in the corrosion protection of superheaters, the invention also assists in reducing the fouling of thermal surfaces.

The excellent action of the compounds appears to be due, among other things, to the large proportion of effective sulphur in the compounds. For example, ferric(III)sulphate $Fe_2(SO_4)_3$ disintegrates thermally to form ferric(III)oxide and sulphur trioxide, which fix alkali compounds very aggressively. This has a significant technical effect. As is known, the literature on the field refers to the ferric(III)oxide $SO_2 \rightarrow SO_3$ reaction as a catalyst, which also means that this oxide will effectively prevent the reduction of $SO_3$ that has already formed.

The compounds are used with or without the water of crystallization, singly, as mixtures, or as part of larger molecules (such as ammonium aluminium sulphate $NH_4Al(SO_4)_2$. The economic dosing of sulphur and sulphur/aluminium-compound-based reagents will be enough to prevent the deposition of chlorine, if they are sprayed as a solution into the superheater area of fluid-bed boilers.

Of sulphur compounds, sulphur trioxide $SO_3$ effectively destroys alkali chlorides that have evaporated from the fuel, and which would otherwise condense onto the surfaces of the superheater, with resulting chlorine corrosion.

In principle, the invention has the potential for worldwide application. It is necessary, when energy is produced from demanding chloritic biomasses and waste.

In the following, the invention is examined in detail with reference to the accompanying drawings showing some embodiments of the invention.

In these embodiments, the economical dosing of sulphur and aluminium-compound-based reagents will be sufficient to prevent the deposition of chlorine, if they are sprayed into the superheater area of a steam boiler. In that case, the reagents will not spread in the lower parts of the furnace, so that they can be used to achieve an excellent effect/price ratio in the destruction of alkali compounds. Solubility in a liquid is a requirement if the reagents are to be added in a solution. In addition, the reagent should be cheap, and in the case of a sulphur reagent there should be a large proportion of sulphur in the molecules. The aforementioned conditions are met by aluminium sulphate $Al_2(SO_4)_3$ and ferric (III) sulphate $Fe_2$ (SO₄)₃. From these sulphur trioxide SO₃ is obtained, which immediately reacts with the alkali compounds.

If the alkali compounds are marked generally with the term MCl, their fixing will be based on the following chemical equation:

$$2MCl + SO_3 + H_2O > 2HCl + M_2SO_4$$

Figure 1:
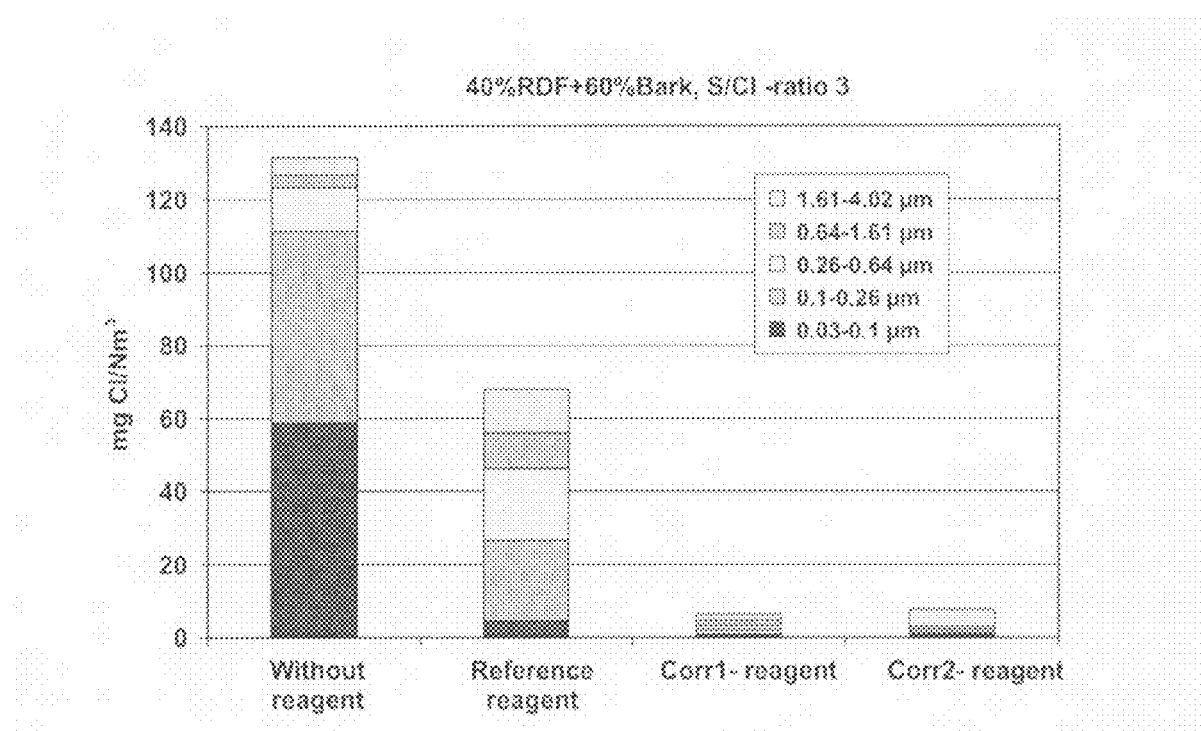
FIG. 1 shows a comparison of reagents at a fixed dosage.
Figure 2:
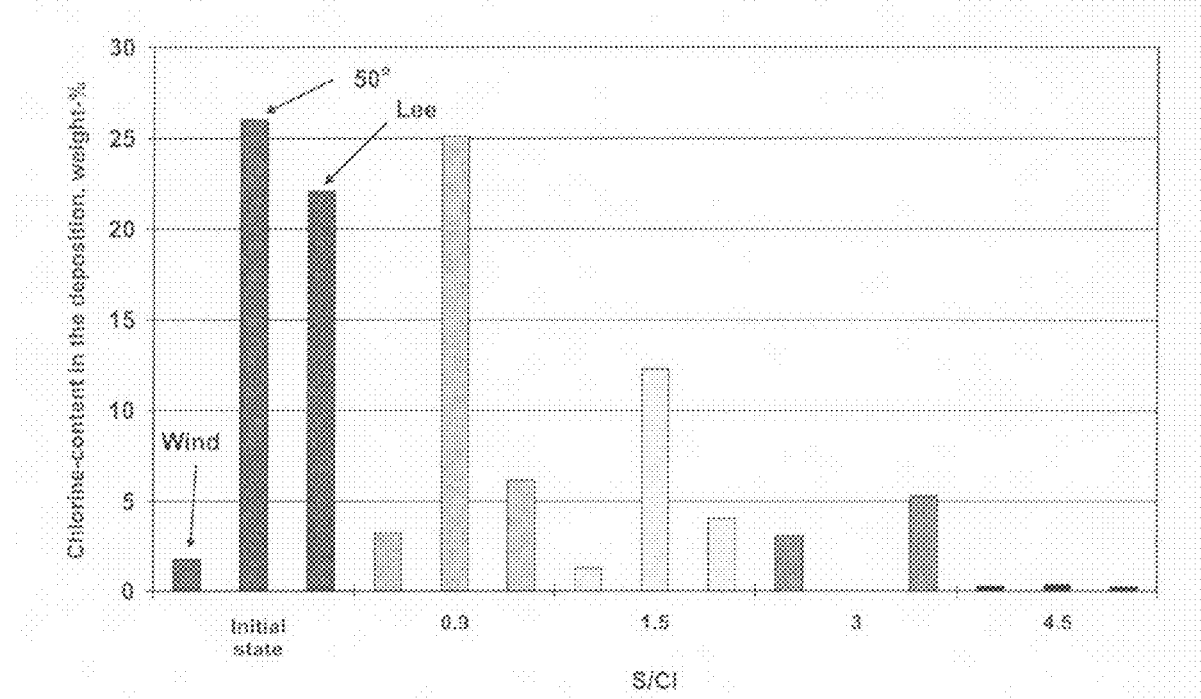
FIG. 2 shows the effect of a known reagent at different dosages.
Figure 3:
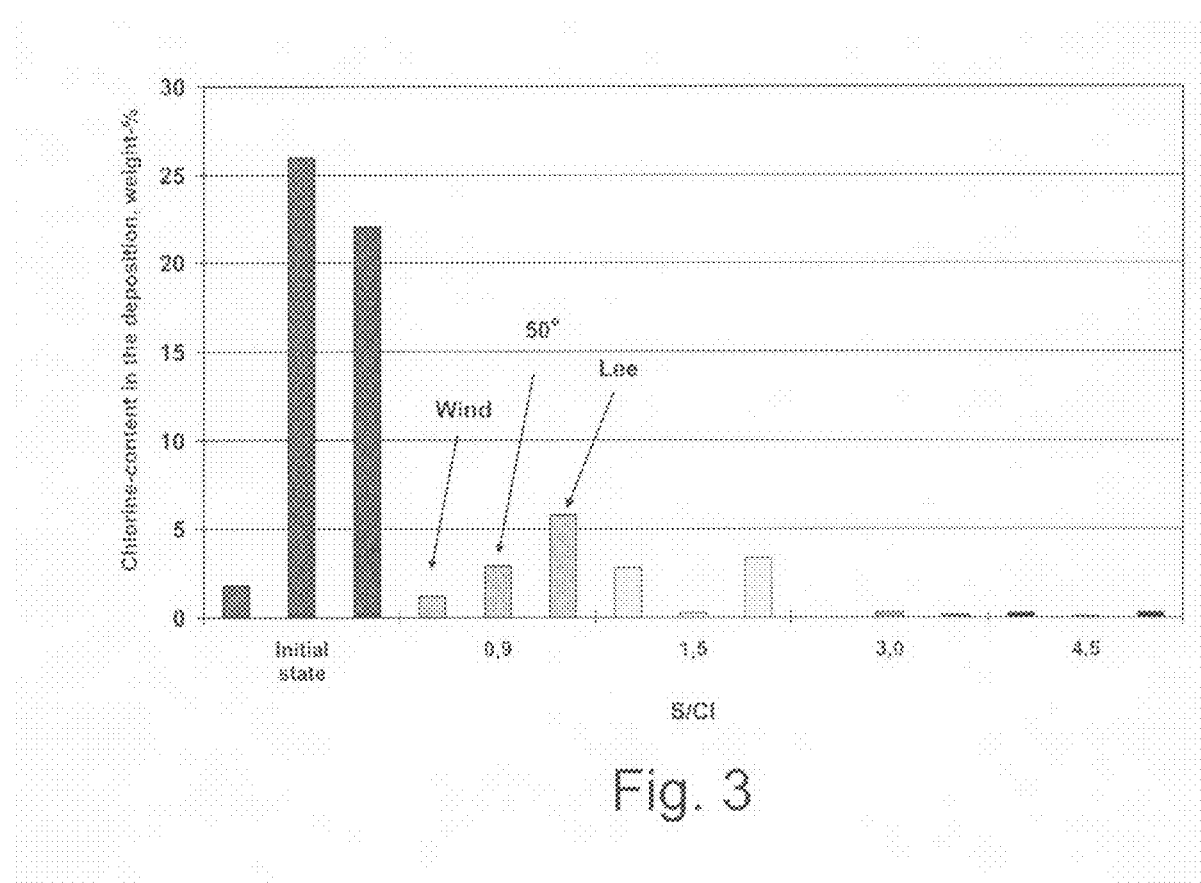
FIG. 3 shows the effect of a reagent according to the invention, at different dosages.

In the accompanying FIGS. 1-3, the deposition of chlorine on a deposit probe is shown using selected reagents and doses. The columns show the chlorine content of the deposition at different points. The chlorine content of the deposition was analysed after each combustion test. The experiment was made in a 20-kW research boiler, in which a mixture of bark and pelleted fuel from recycling was burned. The depositions were collected over a period of three hours and were measured on the probes's wind and lee surfaces and at an angle of 50° relative to the intake direction of the flue gas.

FIG. 1 shows the mass flows of the chlorine that travels with the finer fly ash (<4.1 μm) using a previously known reference reagent (ammonium sulphate, aforementioned WO publication) and two reagents according to the invention; Corr 1 (aluminium(III)sulphate) and Corr 2 (ferric(III)sulphate) when burning described risky fuels. Dosage used: ratio of reagent molar sulphur flow to molar chlorine flow of the fuel=3.

FIG. 2 shows the deposition of chlorine at the various sampling points using varying doses of a previously known reagent. S/Cl=ratio of the molar sulphur flow of the reagent and the molar chlorine flow of the fuel.

FIG. 3 shows a comparison as in FIG. 2, except that the reagent is aluminium sulphate according to the invention. The first 'initial state' series of FIG. 3 shows reference values, when an additive is not used. There was strong deposition of chlorine, except on the wind surfaces. In the other tests, the dosing of the aluminium sulphate was linked to the sulphur/chlorine, i.e. S/Cl mol ratio, which means the mol ratio of the sulphur contained in the reagent and the chlorine contained in the fuel. The experiment was carried out using mol ratios of 0.9; 1.5; 3; and 4.5. As a totality, the experiment shows that already at a molar dose of 1.5-2.0 the depositions of chlorine reduced so much that they were no longer detrimental. On a boiler scale, in which the conditions are not ideal, the range 2-3 appears to be sufficient.

The more advantageous dosing of sulphate is thus in the range 2-5 mols of sulphur to each mol of chlorine.

The precise addition of reagents prevents corrosion of the heat-transferring surfaces in steam boilers using biomass and waste fuels. Generally, soluble $SO_4^{2-}$ compounds are suitable for this purpose.

The compound used is sprayed in the direction of the flue-gas flow into the front side of the superheater area, as a water solution and in a drop size of 1-100 μm, preferably 10-20 μm. This drop size can be carried out easily with commercial nozzles. Here can be used for example spraying technics, which is known from SCR/SNCR technics.

The sulphates in question dissolve well in water (at least 30 weight-% and at most 80 weight-% of the weight of the solution. This depends on the reagent, more precisely CRC, Handbook of Chemistry and Physics. It is preferable to use the strongest possible solution, in order to avoid spraying excess water into the boiler.

It will be seen from FIG. 1 that many other factors than the dosage of the additive measured by the S/Cl ration affect the ability of the reagent to capture chlorine from alkali chlorides. The presence of alkali chlorides is revealed when analysing the fine fly ash (less than 4.1 μm) in which they are compressed in connection with sampling. In addition to sulphur, a cation (a cation of a commercial reagent, Fe3+ or Al3+) plays an active role in promoting sulphating, or bringing increased power, for example, in the form of an aluminium-silicate reaction.

When comparing FIGS. 2 and 3, it will be noticed how much more effectively aluminium(III)sulphate (FIG. 3) prevents the deposition of chlorine, compared to a known reference reagent, if the dosing is constant. The capture of alkalis from alkali chlorides by sulphating is effective while, in addition, aluminium may have the ability to form alkali aluminium silicates in these conditions, because aluminium(III)sulphate clearly demonstrated itself to be also more effective than ferric(III)sulphate. FIGS. 1, 2, and 3 also agree well with each other: It can be seen from FIG. 1 that with aluminium (III)sulphate the alkali chloride content is much lower than with the reference reagents, if the S/CL is constant, while correspondingly with aluminium(III)sulphate the deposition of chloride is clearly weaker than with the reference reagents.

The invention claimed is:

1. Method for preventing chlorine deposition on heat-transferring surfaces of a boiler, in which boiler a fuel with a chlorine content is burned, said method comprising the steps of:
    feeding a compound with a sulphate content to the boiler, said compound forming a reagent that fixes alkali compounds, and said compound being ferric(III) sulphate, $Fe_2(SO_4)_3$ and/or aluminium(III) sulphate, $Al_2(SO_4)_3$;
    spraying said compound in a drop size of 1-100 μm close to and on the front side of a thermal surface of the boiler to be protected, as a water solution, wherein heat causes said compound to thermally decompose into a metal oxide and sulphur trioxide ($SO_3$) such that the sulphur trioxide reacts with said alkali compounds to destroy said alkali compounds and to capture chlorine from said alkali compounds, thereby preventing the deposition of said chlorine content of said fuel.

2. Method according to claim 1, characterized in that the dosage of the sulphate is such that the sulphur contained in the reagent is in the range of 2-5 mols for every mol of chlorine contained in the fuel, in a case in which the fuel does not contain sulphur.

3. Method according to claim 1, characterized in that said compound is sprayed in a drop size of 10-20 μm.

4. Method according to claim 1, characterized in that the compound with a sulphate content is fed to a superheater area of the boiler, and said thermal surface is part of said superheater.

* * * * *